United States Patent
Brownlow et al.

(10) Patent No.: US 9,262,389 B2
(45) Date of Patent: Feb. 16, 2016

(54) RESOURCE-ADAPTIVE CONTENT DELIVERY ON CLIENT DEVICES

(75) Inventors: Sean T. Brownlow, Rochester, MN (US); Nathan G. Faiman, Rochester, MN (US); Michael T. Kalmbach, Rochester, MN (US); John E. Petri, St. Charles, MN (US); Kevin Wendzel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 13/565,126

(22) Filed: Aug. 2, 2012

(65) Prior Publication Data

US 2014/0040721 A1 Feb. 6, 2014

(51) Int. Cl.
*G06F 17/24* (2006.01)
*G06F 17/22* (2006.01)

(52) U.S. Cl.
CPC .......... *G06F 17/24* (2013.01); *G06F 17/2247* (2013.01)

(58) Field of Classification Search
CPC .............. G06F 17/30905; H04L 67/2823
USPC ........................................... 715/234
See application file for complete search history.

(56) References Cited

U.S. PATENT DOCUMENTS

| | | | | |
|---|---|---|---|---|
| 6,281,874 B1 * | 8/2001 | Sivan | .................. | G06F 17/3028 345/2.1 |
| 6,396,507 B1 * | 5/2002 | Kaizuka | ................ | G06T 3/0025 345/660 |
| 6,700,589 B1 * | 3/2004 | Canelones | ........ | G06F 17/30905 345/660 |
| 7,339,573 B2 * | 3/2008 | Andert | .................. | G06F 3/0481 345/157 |
| 7,834,849 B2 * | 11/2010 | Hunleth | ................ | G06F 3/0482 345/156 |
| 7,996,000 B1 * | 8/2011 | Dubinko | ........... | G06F 17/30905 455/414.4 |
| 8,279,241 B2 * | 10/2012 | Fong | ..................... | G06F 3/0482 345/173 |
| 8,384,726 B1 * | 2/2013 | Grabowski | .............. | G06T 15/20 345/539 |
| 8,555,165 B2 * | 10/2013 | Hunleth | ................ | G06F 3/0482 715/709 |
| 2002/0054117 A1 * | 5/2002 | van Dantzich | ........ | G06F 3/0482 715/766 |
| 2002/0105531 A1 * | 8/2002 | Niemi | ....................... | G06F 3/14 345/660 |
| 2008/0125151 A1 * | 5/2008 | Kim | .................. | H04M 1/72561 455/466 |
| 2009/0089448 A1 | 4/2009 | Sze et al. | | |
| 2009/0164940 A1 * | 6/2009 | Wampler | ............... | G06Q 30/02 715/808 |
| 2010/0010958 A1 | 1/2010 | Perrow et al. | | |
| 2010/0229115 A1 | 9/2010 | Augustine et al. | | |

(Continued)

OTHER PUBLICATIONS

Stackoverflow.com "Change div content if screen resolution is less than?" Nov. 13, 2010, pp. 1-4 http://stackoverflow.com/questions/4145190/change-div-content-if-screen-resolution-is-less-than.*

*Primary Examiner* — Kyle Stork
*Assistant Examiner* — Mario M Velez-Lopez
(74) *Attorney, Agent, or Firm* — Patterson & Sheridan, LLP (57) ABSTRACT

Techniques are disclosed for serving a webpage based on a zoom level. The techniques include requesting, by a client device, contents of a webpage. The request may include indications of a zoom level and a viewable area of the webpage as shown on a display of the client device. A server system may determine that the zoom level indicated in the request is less than a threshold value and identify content items within the viewable area which meet predefined criteria for being considered expensive. Further, the server system may serve a modified webpage which includes replacement items in lieu of the expensive content items.

19 Claims, 4 Drawing Sheets

(56) References Cited

U.S. PATENT DOCUMENTS

| | | | | |
|---|---|---|---|---|
| 2011/0035274 A1* | 2/2011 | Goel | ................. | G06Q 30/02 |
| | | | | 705/14.45 |
| 2011/0167170 A1* | 7/2011 | Kovvali | ............... | H04W 28/06 |
| | | | | 709/232 |
| 2011/0258563 A1* | 10/2011 | Lincke | ............. | G06F 17/30905 |
| | | | | 715/760 |
| 2012/0001914 A1* | 1/2012 | Pan | ................. | G06Q 30/0241 |
| | | | | 345/428 |
| 2012/0254288 A1* | 10/2012 | Lejeune | ............. | H04N 21/2358 |
| | | | | 709/203 |
| 2013/0063465 A1* | 3/2013 | Zaman | ............... | G06F 3/04883 |
| | | | | 345/582 |
| 2013/0166997 A1* | 6/2013 | Hadley | ............. | G06F 17/30864 |
| | | | | 715/202 |
| 2014/0038514 A1* | 2/2014 | Robbins | ................. | 455/3.06 |

* cited by examiner

RESOURCE-ADAPTIVE CONTENT DELIVERY ON CLIENT DEVICES

BACKGROUND

1. Field of the Invention

The present invention generally relates to serving content to computing devices over a network, and, more specifically, to serving replacement content items where the viewable presence or impact of the content is below a threshed when viewed on a computing device (e.g., when viewing a portion of an image on a webpage rendered a mobile telephone).

2. Description of Related Art

As computing devices become more mobile, display screens have shrunk, increasing the portability of the devices. In many cases, users of these computing devices access webpages that are configured for display on more traditional laptop or desktop computers. Many websites have created streamlined versions of webpages for display on the smartphones, tablet computers, e-readers and the like. However, visiting webpages that have not been optimized for display on mobile devices may lead to inefficiencies.

For example, computing devices with small screens which attempt to display non-optimized webpages meant for regular monitors typically permit users to zoom in and/or pan the view of the webpage. At the same time, the user may only be interested in some portions of the webpage and only zoom in on those parts. Because other parts of the webpage are not zoomed into, downloading and displaying full content for those portions can consume unnecessary bandwidth and waste device resources (e.g., processing cycles, memory, and battery).

SUMMARY

Embodiments of the invention provide a method for serving a webpage based on a zoom level for a view of a webpage. This method may generally include receiving a request for contents of a webpage. The request may include indications of a zoom level and a viewable area of the webpage on a display device of the client device. A server system may determine that the zoom level indicated in the request is less than a threshold value and identify content items within the viewable area of the webpage which meet predefined criteria for being considered expensive. Further, the server system may serve a modified webpage which includes replacement items in lieu of the expensive content items. By serving replacement content when the zoom level is less than the threshold value, network bandwidth and device resources are conserved.

Further embodiments of the present invention include a computer-readable storage medium storing instructions that, when executed by a client device and a server system, cause the client device and the server system to perform the disclosed methods, and a system including a client device and a server system programmed to carry out one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide techniques for modifying webpages when a zoom level for a view of a webpage exceeds a threshold value (also referred to herein as the "zoom threshold"). When a client device requests a webpage from a server system, the client device indicates a zoom level for a view of the webpage as displayed on the client device. For example, the zoom level may indicate the magnification percentage of a view of the webpage within a web browser. Alternatively, the zoom level may be a zoom level of the display screen of the client device. If the zoom level is less than a threshold value, the server identifies expensive content of the webpage and modifies the webpage to replace the expensive content with a less expensive version or with placeholder content referring to the expensive content. Content may be considered "expensive" relative to the computing resources (or other resources) needed to deliver or render that content on the client device. For example, an image or video clip may be available at multiple resolution levels. In such a case, the higher resolution versions would be considered to be more expensive then a lower resolution as more bandwidth is required to transfer the video clip to a client device and more computing resources are needed on that device to decode and render the video. Similarly, "expensive" could refer to cost of obtaining the content as well. For example, a licensing arrangement could specify a higher license fee to a webpage operator use of a high resolution copy of an image than for the use a low resolution image. Of course, content could be considered "expensive" relative to any criteria suitable in a particular case. A variety of metrics may be used to identify expensive content, including, e.g., file size (e.g., >1 MB), image resolution (e.g., >640×320 resolution), video duration (e.g., >1 minute), etc. After modifying the webpage to replace the expensive content, the server serves the modified webpage to the client device.

Should the user change the view of the webpage, the client device may request expensive content if the zoom level becomes greater than the threshold value. That is, if the user brings the portion of the webpage where the expensive content is located into focus, then the replacement content may itself be replaced with the original, expensive content. By only downloading and rendering "expensive" content as disclosed herein, network bandwidth and device resources are conserved.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
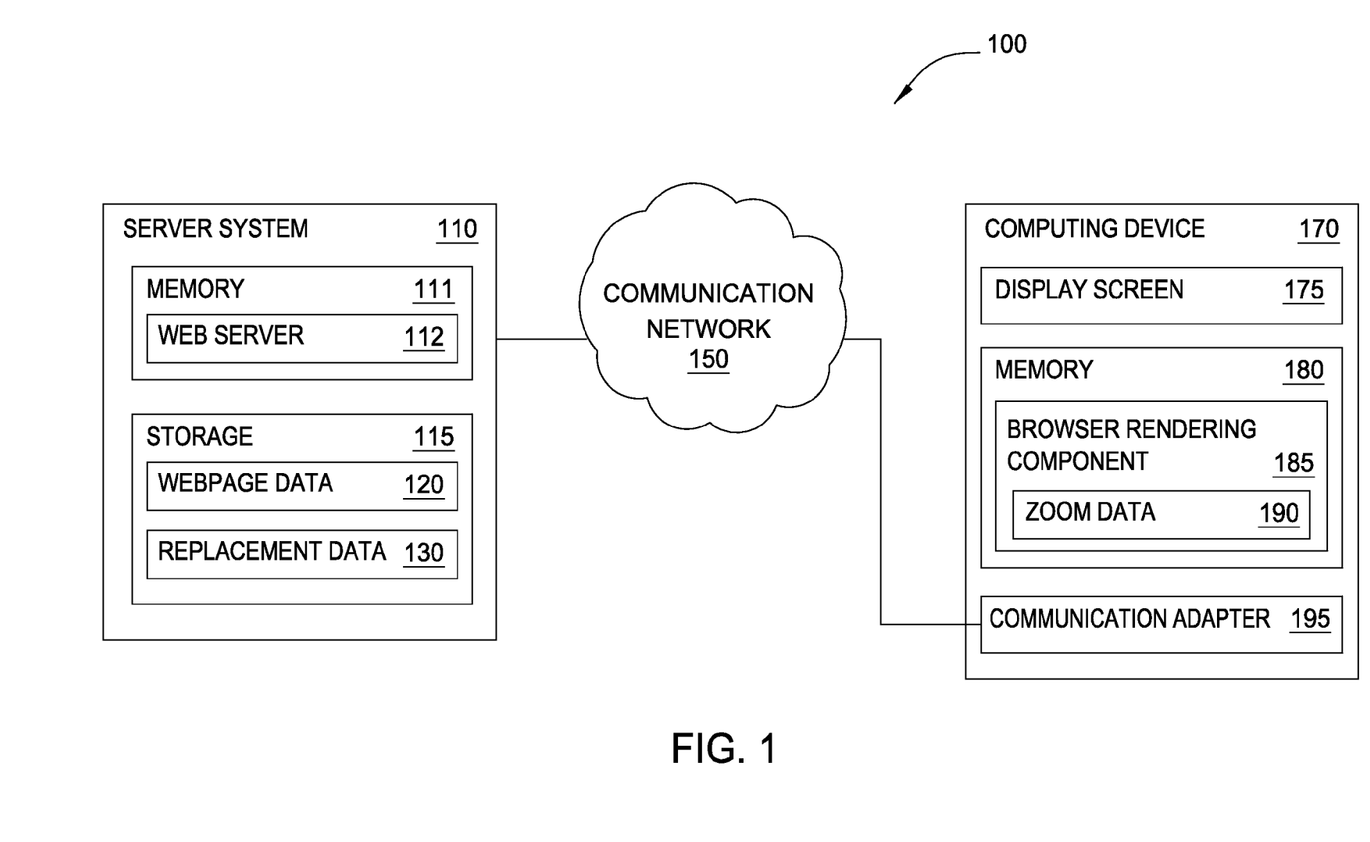
FIG. 1 illustrates a system for serving webpage content, according to one embodiment of the invention.

FIG. 1 illustrates a system 100 for serving webpage content, according to one embodiment of the invention. As shown, the system 100 includes a server 110, communication network 150 and computing device 170. In general the computing device 170 is coupled to the communication network 150, which permits the computing device 170 to transmit and receive data from the server 110. In the reference example described herein, the server 110 may be a web server that transmits data (e.g., webpage files) rendered on a display of the computing device 170.

The computing device 170 may be any processor-containing device that permits a user of the device to view and interact with a webpage, e.g., submit information to the server 110 via the webpage, zoom/pan/scroll throughout the webpage, access data sources using the webpage, and the like. The display screen 175 may be any type of screen (e.g., LCD, CRT, etc.) and may be integrated into the computing device or be a separate component. In one embodiment, the display screen 175 may be touch sensitive such that a user may use a finger or a tool to interact with the webpage by contacting the display screen 175. Alternatively, the user may use a separate device such as a mouse, an integrated scroll ball, touch pad, and the like to interact with the displayed webpage.

The memory 180 represents random access memory (RAM) devices comprising the storage of the computing device 170, as well as supplemental levels of memory, e.g., cache memories, non-volatile or backup memories (e.g., programmable or flash memories), read-only memories, and the like. Illustratively, the memory 180 includes a rendering component 185 for displaying a webpage on the display screen 175. The rendering component 185 may receive input from the user to change the view of the webpage (e.g., zoom in) or to input data into the webpage. The rendering component 185 determines the changes requested by the user and updates the image displayed on the screen 175 based on the user request. In one embodiment, the rendering component 185 may be part of a web browser on the computing device 170 or a plug-in that may enhance the functions of the browser.

Further, the rendering component 185 may be configured to permit zooming in and out of a view of the webpage, as well as panning and scrolling through the webpage. As used herein, "zooming in" typically refers to increasing the number of pixels used by text or images such that the text or images become larger on the screen. Zooming in may also involve increasing the spacing between the text or images such that the ratio of the size and the spacing of the text and images remains constant. Alternatively, in some computing devices, increasing the pixel density and increasing the resolution of the display screen 175 are synonymous to zooming out while decreasing the pixel density and decreasing the resolution are synonymous to zooming in. Conversely, "zooming out" typically means reducing the number of pixels used by text or images such that the text or images become smaller in the screen. This may also involve decreasing the spacing between the text or images such that the ratio of the size and the spacing of the text and images remains constant.

In one embodiment, panning or scrolling requires that an area of the view of the webpage is taken from the unviewable area and placed in the viewable area corresponds to a same sized area being taken from the viewable area. For example, a scroll bar may be provided, and scrolling down using the scroll bar may add lower portions of the webpage to the viewable area but remove some of the higher portions of the webpage located at the top of the viewable area.

Zoom data 190 indicates a current zoom level of the image displayed on the screen 175. Using the zoom data 190 and webpage data indicating that one or more content items of the webpage have been replaced, the rendering component 185 may request items from the server system 110 when the zoom data 190 indicates that a predefined zoom threshold has been met. In one embodiment, rendering component 185 requests expensive content for the area that is currently viewable after the user brings the area having the expensive content into focus such that the size of the viewable area (relative to the area of the display) exceeds the threshold for presenting expensive content on the device. For example, low resolution versions of an image could be used in place of high resolution images (which take longer to deliver across a network and render on a client device) could be provided so long as the percentage of a display showing an image is below the threshold. After being zoomed in beyond the zoom threshold, the rendering component 185 requests further expensive content for another viewable area when the user pans the display to show that other area. In an alternative embodiment, the rendering component 185 may request expensive content for areas of the webpage that are at least partially displayed within the viewable area. In such a case, the rendering component 185 may request further expensive content only when the user pans the display to show areas where such content is positioned within the webpage. In yet another embodiment, the rendering component 185 may request expensive content for the entire webpage when the zoom level exceeds the zoom threshold. In such a case, the rendering component 185 requests expensive content only once—when the zoom level exceeds the threshold.

In one embodiment, rendering component 185 may zoom and pan through the webpage to display a portion of the webpage that is most relevant to the user (e.g., a portion of the webpage that the user zooms in to view the most often). In such a case, the rendering component 185 may request expensive content for that portion of the webpage if the zoom threshold is met. In addition, the rendering component 185 may request expensive content for other portions that the rendering component 185 determines to be relevant and that the user is likely to view. That is, the rendering component 185 may selectively request expensive webpage content that the user is likely to view, thereby making such content available without further download. In contrast, the rendering component 185 may request and download expensive content for less relevant areas only when the user zooms in to view those areas.

The communication adapter 195 may comprise a network card configured for wired or wireless communication. For example, the communication network may include an Internet service provider (ISP) to which the communication adapter 195 is connected. The ISP provides the computing device 170 access to a WAN (e.g., the Internet). In one embodiment, the communication network 150 includes a cellular service provider. The computing device 170 may be a mobile device such as a smartphone, tablet computer, or laptop that is configured to connect to a cell tower in the communication network 150. Using the cellular service provider, the computing device 170 may transmit data to and receive data from the server 110.

The server 110 includes storage 115 which may represent one or more of random access memory (RAM), cache memories, non-volatile or backup memories (e.g., programmable or flash memories), read-only memories, magnetic storage devices (e.g., hard drives or tape drives) and the like. The storage 115 serves as a repository for storing the necessary data for serving modified and unmodified versions of the webpage to the computing device 170, including webpage data (also referred to herein as "content data") 120 and replacement data 130. For example, webpage data 120 may include any kind of data useful for displaying interactive webpages such as different types of HTML (e.g., Dynamic HTML or XHTML) or programming code (Java®, Flash®, and the like). Replacement data 130 may include, but is not limited to, icons, text, etc. used to replace expensive content items. In one embodiment, replacement data 130 may include references (e.g., HTML links) to the expensive content items.

A web server application 112 running on the server 110 serves webpages to clients such as computing device 170. The web server application 112 may be configured to receive a zoom threshold value and a current zoom level from the computing device 170. Of course, the web server application 112 may also use a default threshold value, generate its own threshold value, or serve webpages unmodified if no threshold value is specified by the computing device 170. The web server application 112 may determine one or more expensive content items for replacement based on whether the current zoom level is greater than (or greater than or equal to) the zoom threshold value. The web server application 112 may further store the zoom level and zoom threshold values for future use. For example, the web server application 112 may modify a webpage based on the stored behavior of particular device types which were previously used to access the webpage, thereby permitting requests for the webpage from devices of those device types to be serviced more efficiently. As another example, the web server application 112 may cache content items of a webpage based on stored zoom levels so that frequently viewed and/or zoomed-into contents are cached, and vice versa.

In one embodiment, the web server application 112 may be a proxy server application which intercepts requests from computing device 170 and modifies webpages according to the techniques disclosed herein. Likewise, server system 110 may be a proxy server.

Although described above with respect to the web server application 112 receiving a zoom threshold from the computing device 170, in alternative embodiments, the zoom threshold may be determined by web server application 112.

Figure 2:
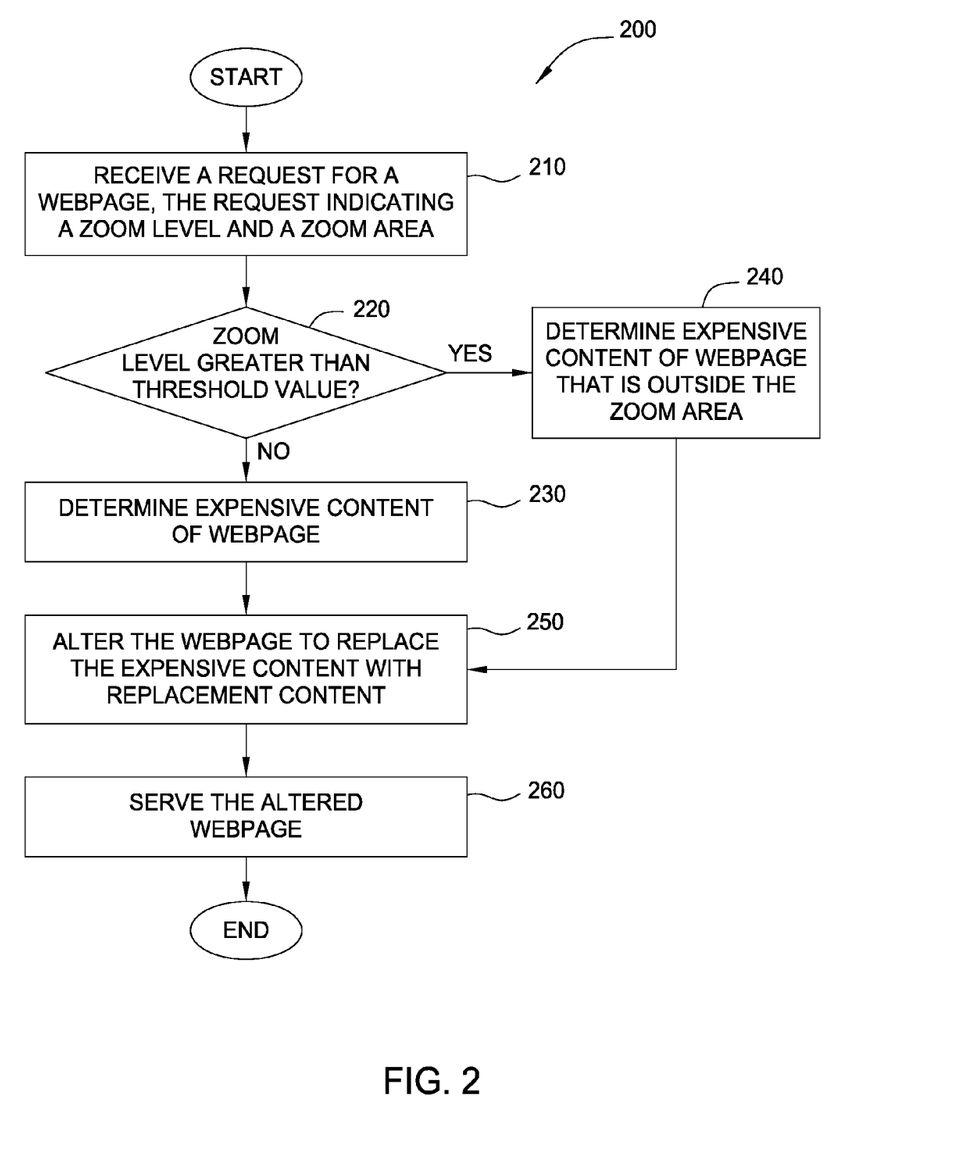
FIG. 2 illustrates a method for replacing webpage content based on whether a zoom level is greater than a zoom threshold, according to one embodiment of the invention.

FIG. 2 is a flow chart illustrating a method 200 for replacing webpage content based on whether a zoom level is greater than a zoom threshold, according to one embodiment of the invention. Although the method steps are described in conjunction with FIG. 1, persons skilled in the art will understand that any system configured to perform the method steps, in any order, falls within the scope of the present invention.

As shown, the method 200 begins at step 210, where the web server application 112 receives a request for a webpage, the request indicating a zoom level and a viewable area. Such a request may be, for example, an HTTP protocol request. As used herein, "zoom level" specifies the level to which the webpage is magnified (e.g., a percentage magnification). The viewable area is the area of the webpage that will be displayed to the user after a web-page is rendered on the display. For example, the viewable area may indicate an area of the webpage that is displayed immediately after a zoom-in operation.

As discussed, the rendering component 185 may be configured in one embodiment to zoom and pan the webpage based on, for example, prior user interactions with the webpage. In such a case, the request may indicate the zoom level and the viewable area. As discussed in greater detail below, the web server application 112 may serve, in response to the request, content determined to be "expensive," again e.g., in terms of computing or network resources required to deliver and/or render the content, in the indicated viewable area if the zoom level exceeds a threshold. When the zoom level is less than the threshold, the web server application 112 may modify the webpage to replace all expensive content and serve the modified webpage in response to the request.

In a further embodiment, web server application 112 may be configured to determine whether the computing device 170 is, for example, a mobile device or another type of device having a display screen for which the webpage is not optimized. For example, in the HTTP protocol, the computing device 170 may transmit a user agent identifying the display screen resolution of the computing device 180, and the web server application 112 may determine, based on these characteristics, if the webpage is optimized for display screens having higher resolution than the display screen of the computing device 170.

At step 220, the web server application 112 determines whether the zoom level received at step 210 is greater than a predefined threshold. In one embodiment, the threshold may be indicated by the computing device 170. For example, the threshold may be indicated in the request received at step 210. Further, the threshold may be specified by a user of the computing device 170 or determined by the computing device 170. In alternative embodiments, the threshold may instead be specified on the server side.

If the zoom amount is less than the predefined threshold, then at step 230, the web server application 112 determines expensive content of the webpage. As noted above, content may be considered "expensive", e.g., relative to the computing resources needed by the server or by the client device to process the content or the bandwidth needed to transmit the content from the server to the client device. Further, expensive content may be determined according to various metrics, including, but not limited to, file size (e.g., >1 MB), image resolution (e.g., >640×320 resolution), video duration (e.g., >1 minute), etc. In some embodiments, criteria or conditions for determining whether content is "expensive" may be specified by a user on the server or client side. In alternative embodiments, the zoom threshold level may be automatically generated by the server system 110 or the computing device 170 based on, for example, device display and resource characteristics, network bandwidth usage, etc. When expensive is specified or determined on the client side, the computing device 170 may indicate how "expensive" is defined in the request of step 210.

If the zoom amount is greater than the predefined threshold, the method 200 continues at step 240, where the web server application 112 determines expensive content of the webpage that is outside the viewable area. In an alternative embodiment, the web server application 112 may divide the webpage into a plurality of areas, and, in such a case, the web server 112 may determine the expensive content in those areas that are not currently viewable in whole or in part. In yet another embodiment, the web server 112 may always determine the expensive content of the entire webpage at step 230 when the threshold is exceeded and serve that content to computing device 170.

At step 250, the web server application 112 replaces the expensive original content determined at steps 230 and 240 with replacement content. That is, the web server application 112 replaces, for example, expensive content in the viewable area if the zoom threshold is not exceeded and expensive content outside the viewable area if the zoom threshold is exceeded. In an alternative embodiment, the web server application 112 may only serve content in the viewable area. If the user then zooms out, the computing device 170 may further request additional webpage content, which may be replaced with replacement content.

The web server application 112 may replace the expensive content in any feasible manner, and the server application 112 may further modify the web page to, for example, include an application which runs on the computing device 170 and downloads expensive content when the zoom threshold is exceeded.

In one embodiment, the web server application 112 may replace expensive content by rewriting the webpage's HMTL code to include a reference to a replacement object in lieu of a reference to an expensive object. For example, an HTML reference to a high-resolution image having a large file size may be replaced with a reference to a low-resolution image having a smaller file size. In an alternative embodiment, the web server application 112 may select replacement objects to serve to computing device 170 without altering the HTML code. For example, storage 115 may use the same file name to store both webpage objects and replacement objects. If the HTML code references an object by its file name, the web server application 112 may serve that HTML code along with the replacement object with the same file name as the original, expensive object.

In yet another embodiment, the web server application 112 may alter the webpage to include an application (e.g., an Ajax or Javascript® application) configured to request expensive content when the zoom threshold is exceeded. Such an application may be served to the computing device 170 along with the webpage and thereafter run on the computing device 170 as the user views the webpage. Further, such an application may store indications of previously received expensive content so that such content is not repeatedly requested if the zoom threshold is exceeded more than once (e.g., where the user zooms in, zooms out, and zooms in again on the same area).

In alternative embodiments, server system 110 may store altered portions of the webpage. For example, the web server application 112 may modify various areas of webpages via batch processing and cause the modified areas to be stored in storage 115. When a request for the webpage is received and the request indicates that the current zoom level is less than the zoom threshold, the web server application 112 may serve stored modified areas that are currently viewable in lieu of the original content in those areas.

At step 260, the web server application 112 serves the modified webpage. That is, web server application 112 transmits the altered webpage via the communication network 150 to the computing device 170. Rendering component 185 may then render the webpage on display screen 175.

Figure 3:
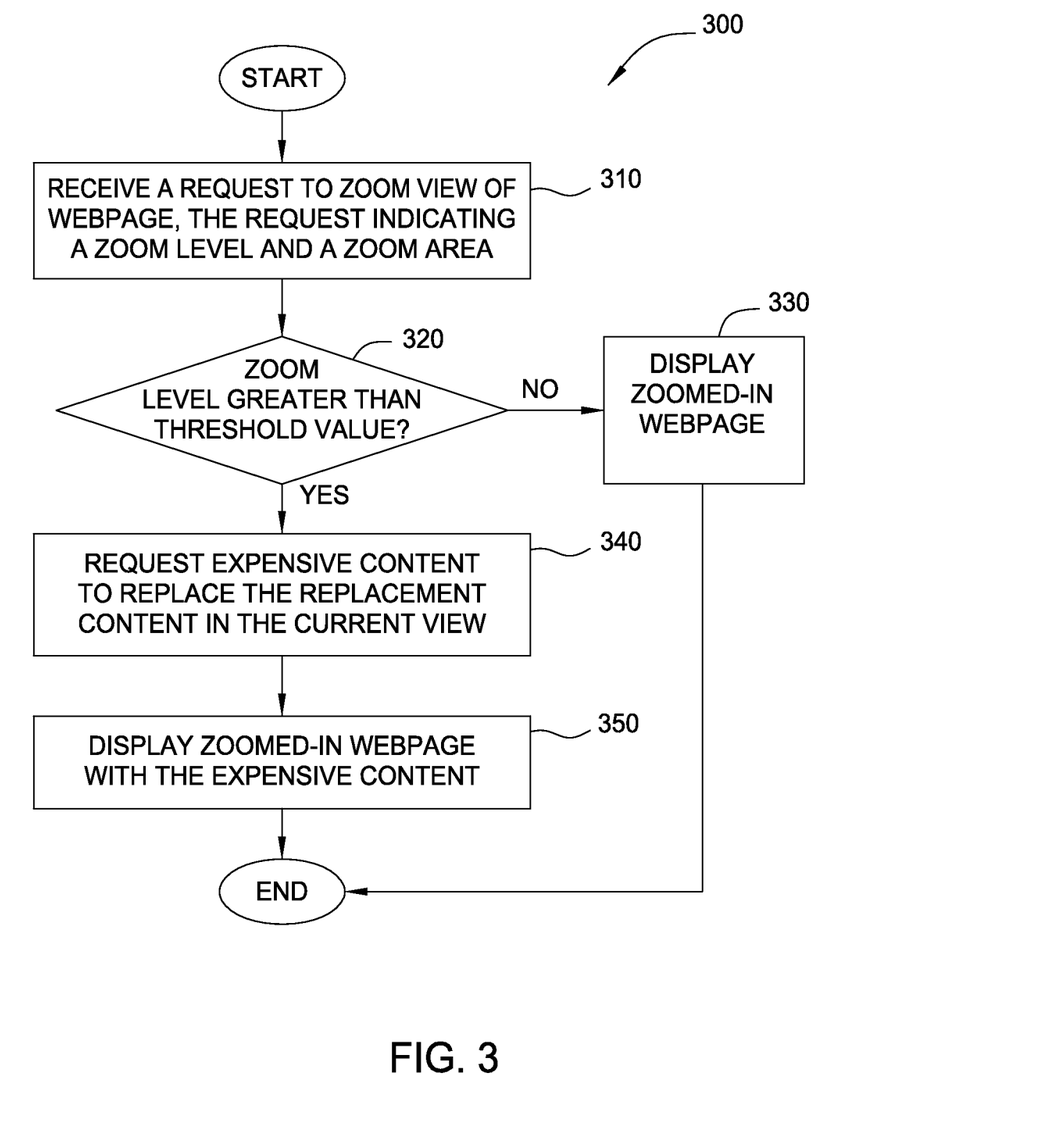
FIG. 3 illustrates a method for requesting webpage content based on whether a zoom level is greater than a zoom threshold, according to one embodiment of the invention.

FIG. 3 illustrates a method for requesting expensive webpage content when a zoom threshold is exceeded, according to one embodiment of the invention. As shown, the method 300 begins at step 310, where the rendering component 185 receives a request to change a current view of the webpage. In one embodiment, the request may indicate a zoom level and a center point of the zoom. The "center point" of the zoom generally refers to the point of the view of the webpage about which the zoom occurs. For example, a user may indicate a zoom of 200% and a center point that is the center of the view of the webpage. As a result of such a zoom, a portion of the displayed view of the webpage corresponding to the middle 50% of the webpage may be displayed. Of course, other techniques may be used to zoom the view of the webpage. For example, the user may draw a rectangle with a screen pointer, and the rendering component 185 may zoom the view of the webpage to magnify webpage contents within the rectangle.

At step 320, the rendering component 185 determines whether the zoom level exceeds a threshold value. As discussed above, the webpage may include an application (e.g., an Ajax or Javascript® application) which determines whether the zoom level exceeds the zoom threshold value as a result of the requested zoom. Alternatively, the rendering component 185 may be configured to determine whether the zoom level exceeds the zoom threshold value.

In some embodiments, the zoom threshold value may be a predefined value specified by a user on the server or client side. In an alternative embodiment, the zoom threshold level may be automatically generated on the basis of, for example, device display and resource characteristics, network bandwidth usage, etc.

If the zoom level does not exceed the zoom threshold value, the method 300 continues at step 330, where the rendering component 185 renders the zoomed-in webpage without requesting expensive content to replace the replacement content. That is, the rendering component 185 performs a local zoom operation without communicating with the server system 110.

If the zoom level exceeds the predefined threshold value, the method continues at step 340, where the rendering component 185 sends a request for expensive content in the viewable area to the server system 110. The request for expensive content may or may not indicate particular expensive content items. In one embodiment, the rendering component 185 may be unaware of which content items are replacements for expensive content items. In such a case, the rendering component 185 may simply make a request for any expensive content items in the viewable area which may have been replaced, without specifying particular expensive content items. In response, the web server application 112 may determine expensive content for the viewable area and serve that expensive content to the computing device 170. Further, the web server application 112 may maintain a record of expensive content previously served to the computing device 170 and avoid sending such content to the computing device 170 again.

In an alternative embodiment, the rendering component 185 may be aware of particular replacement content items within the viewable area. For example, the webpage may be modified to include indications that one or more content items are replacement content items. In such a case, the rendering component 185 may request expensive content corresponding to particular replacement content items. Further, the rendering component 185 may maintain a record of expensive content previously downloaded and not download such content again.

At step 350, the rendering component 185 renders the zoomed-in webpage with the expensive content and displays the rendered webpage on the display screen 175. In order to incorporate the expensive content back into the webpage, the rendering component 185 may modify the webpage in any feasible manner, such as via the modification techniques discussed above. In particular, the rendering component 185 may insert expensive content back into the webpage by performing an operation that is an inverse of the operation used to replace the expensive content (e.g., changing a reference to the replacement content back to a reference to the expensive content). The rendering component 185 may then display the modified webpage.

Figure 4:
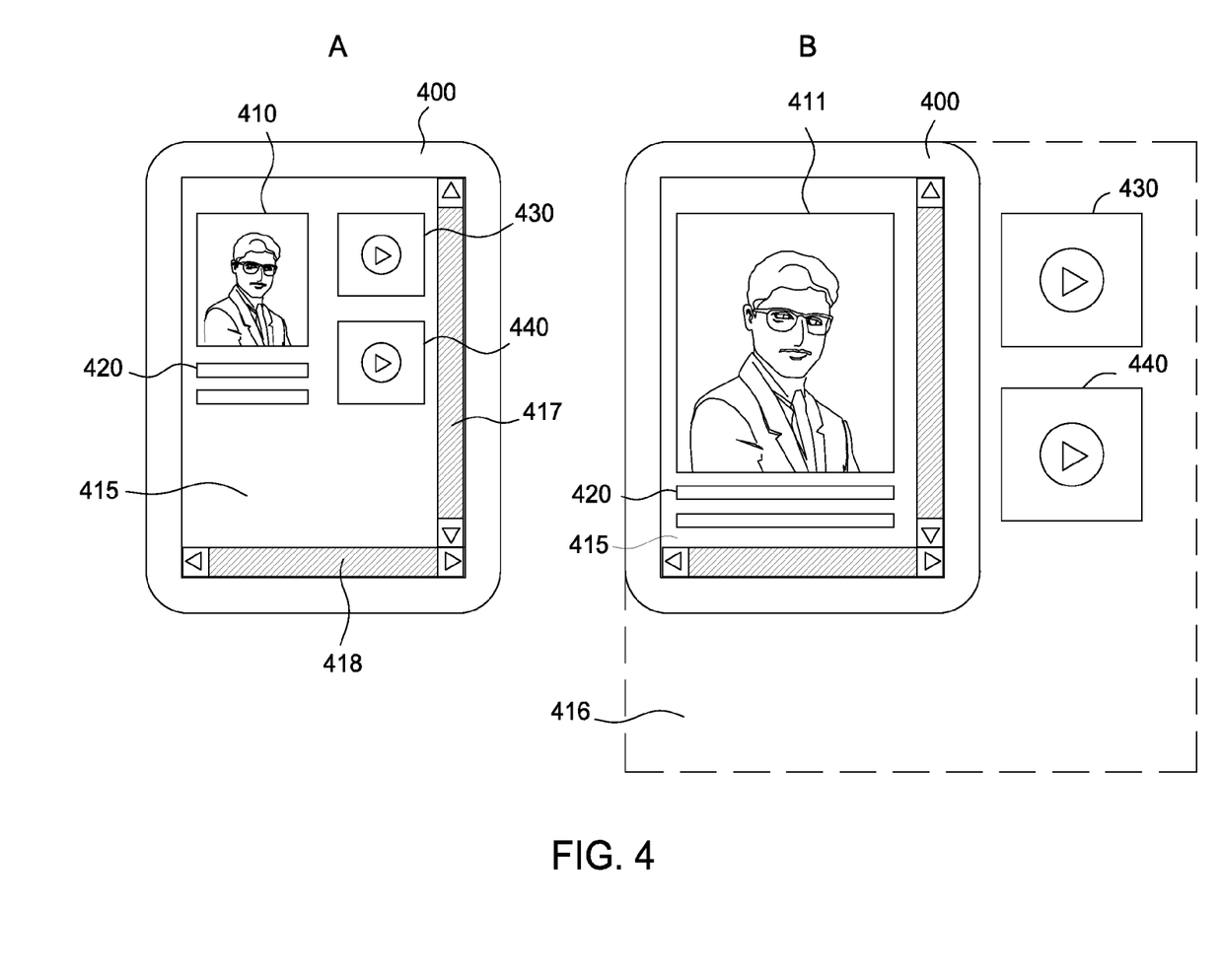
FIG. 4 illustrates zooming to display a relevant portion of the webpage, according to one embodiment of the invention.

FIG. 4 illustrates an example of zooming in to display a relevant portion of the webpage and requesting expensive content for that portion, according to one embodiment of the invention. As shown in panel A, the display device 400 includes a screen 415 which displays a webpage and scroll bars 417 and 418 for panning and scrolling through the webpage.

The displayed webpage includes a plurality of content items 410, 420, 430, and 440. As shown, content item 410 is an image, content items 430 and 440 are icons for videos, and content item 420 may include text and hyperlinks. Further, content items 410, 430, and 440 are illustratively replacement content items which replace expensive content items, because the webpage is displayed in its entirety and the zoom level does not exceed a threshold value. For example, content item 410 may be a low-resolution version of a higher-resolution image. Similarly, content items 430 and 440 may be images in the place of videos. The webpage may display an indication to the user of the content items which are replacement content items. In addition, the webpage may include one or more applications (not shown) which run in the background and are configured to request expensive content when a zoom threshold is exceeded.

As shown in panel A, the webpage is rendered and displayed in its entirety. In contrast, panel B shows only a portion of the webpage being displayed. In panel B, the boundaries of the webpage in panel A are extended to show an unviewable portion 416 of the webpage. The ghosted lines outline the unviewable portion 416 of the webpage that may be accessed if the user zooms out, pans, or scrolls using the scroll bars 417, 418. The ghosted lines merely represent the entire dimensions of the webpage if the physical dimensions of the display screen 415 were increased to fit the entire webpage on the screen 415. In panel B, however, the zoom setting is set such that there is an unviewable portion 416 that extends beyond the dimensions of the screen 415. Thus, a user viewing panel B would see only the viewable portion the webpage as outlined by the physical dimensions of the display screen 415. As shown, the content item 410 is in the viewable portion while the content items 430 and 440 are in the unviewable portion 416 of the webpage.

By panning, scrolling, or zooming, the user may move content of the webpage from the unviewable portion 416 to the viewable portion 415. Further, if the zoom level for the webpage exceeds a threshold value, the replacement content items 410, 430, and 440 which appear in the viewable area may be replaced by expensive content items via techniques similar to those described above in conjunction with FIGS. 2-3. As shown in panel B, content item 410 has been replaced by content item 411. Content item 411 is an expensive content item corresponding to content item 410. For example, content item 411 may be a high-resolution image from which the low-resolution image of content item 411 was created.

Advantageously, embodiments disclosed herein provide a technique for serving expensive content of webpages only when the zoom level exceeds a threshold value. When the zoom level is less than the threshold value, the server modifies the webpage to replace the expensive with less expensive content. When the user then changes the view of the webpage by zooming in and the zoom threshold is met, the user's device may request the expensive content for a viewable area of the webpage. By only downloading and rendering expensive content only in such cases, network bandwidth and device resources are conserved.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
receiving, by a server system, a first request for contents of a webpage, wherein the first request includes indications of a zoom level and a first viewable area of the webpage as displayed by a display device of a client device;
upon determining that the zoom level is less than a threshold value, identifying a first set of one or more content items within the first viewable area of the webpage which meet predefined criteria for being considered expensive for rendering on a client device, wherein each of the first set of content items comprises an instance of media content available at a plurality of resolution levels;
identifying a second set of one or more content items outside of the first viewable area of the webpage which meet the predefined criteria for being considered expensive, wherein each of the first set of content items comprises an instance of media content available at a plurality of resolution levels; and
serving a modified webpage, the modified webpage including a replacement item for each item in the first set of content items and the second set of content items wherein each replacement item replaces one of the first set of content items with an instance of the media content which reduces the resolution level of that media content in the modified webpage.

2. The method of claim 1, further comprising:
receiving a second request for contents of the webpage, wherein the second request includes a viewable area of the webpage as displayed by the display device of the client device, and wherein the second request is sent by the client device in response to the zoom level exceeding the threshold value; and
serving the content items in the viewable area which meet the predefined criteria for being considered expensive.

3. The method of claim 2, wherein the client device includes a rendering application configured to determine whether the zoom level exceeds the threshold value as a result of a zoom-in operation and to request the contents of the webpage if the zoom level exceeds the threshold value.

4. The method of claim 1, further comprising determining the threshold value based on at least one of client device display characteristics, client device resource characteristics, and network usage.

5. The method of claim 1, wherein the threshold value is a parameter specified by one of the client device or the server system.

6. The method of claim 1, wherein the predefined criteria includes at least one of exceeding a predefined file size, exceeding a predefined image resolution, and exceeding a predefined video duration.

7. The method of claim 1, further comprising generating the replacement items based on the corresponding content items.

8. The method of claim 1, wherein the modified webpage includes an application configured to run on the client device, to determine whether the threshold value is exceeded as a result of a zoom-in operation, and to request contents in a viewable area of the webpage if the threshold value is exceeded.

9. A non-transitory computer-readable storage medium storing instructions, which when executed by a server system, performs operations comprising:
receiving, by a server system, a first request for contents of a webpage, wherein the first request includes indications of a zoom level and a first viewable area of the webpage as displayed by a display device of a client device;
upon determining that the zoom level is less than a threshold value, identifying a first set of one or more content items within the first viewable area of the webpage which meet predefined criteria for being considered expensive for rendering on a client device, wherein each of the first set of content items comprises an instance of media content available at a plurality of resolution levels;
identifying a second set of one or more content items outside of the first viewable area of the webpage which meet the predefined criteria for being considered expensive, wherein each of the second set of content items comprises an instance of media content available at a plurality of resolution levels; and
serving a modified webpage, the modified webpage including a replacement item for each item in the first set of content items and the second set of content items, wherein each replacement item replaces one of the first set of content items with an instance of the media content which reduces the resolution level of that media content in the modified webpage.

10. The computer-readable storage medium of claim 9, the operations further comprising:
receiving a second request for contents of a webpage, wherein the second request includes a viewable area of the webpage as displayed by a display device of a client device, and wherein the second request is sent by the client device in response to the zoom level exceeding the threshold value; and
serving the content items in the viewable area which meet the predefined criteria for being considered expensive.

11. The computer-readable storage medium of claim 10, wherein the client device includes a rendering application configured to determine whether the zoom level exceeds the threshold value as a result of a zoom-in operation and to request the contents of the webpage if the zoom level exceeds the threshold value.

12. The computer-readable storage medium of claim 9, the operations further comprising determining the threshold value based on at least one of client device display characteristics, client device resource characteristics, and network usage.

13. The computer-readable storage media of claim 9, wherein the threshold value is a parameter specified by one of the client device or the server system.

14. The computer-readable storage media of claim 9, wherein the predefined criteria includes at least one of exceeding a predefined file size, exceeding a predefined image resolution, and exceeding a predefined video duration.

15. The computer-readable storage media of claim 9, further comprising generating the replacement items based on the corresponding content items.

16. The computer-readable storage media of claim 9, wherein the modified webpage includes an application configured to run on the client device, to determine whether the threshold value is exceeded as a result of a zoom-in operation, and to request contents in a viewable area of the webpage if the threshold value is exceeded.

17. A system, comprising:
a processor; and
a memory, wherein the memory includes an application program configured to perform operations for updating a product documentation, the operations comprising:

receiving, by a server system, a first request for contents of a webpage, wherein the first request includes indications of a zoom level and a first viewable area of the webpage as displayed by a display device of a client device, upon determining that the zoom level is less than a threshold value, identifying a first set of one or more content items within the first viewable area of the webpage which meet predefined criteria for being considered expensive for rendering on a client device, wherein each of the first set of content items comprises an instance of media content available at a plurality of resolution levels;

identifying a second set of one or more content items outside of the first viewable area of the webpage which meet the predefined criteria for being considered expensive, wherein each of the second set of content items comprises an instance of media content available at a plurality of resolution levels, and serving a modified webpage, the modified webpage including a replacement item for each item in the first set of content items and the second set of content items, wherein each replacement item replaces one of content items with an instance of the media content which reduces the resolution level of that media content in the modified webpage.

18. The system of claim 17, the operations further comprising:
receiving a second request for contents of the webpage, wherein the second request includes a viewable area of the webpage as displayed by the display device of the client device, and wherein the second request is sent by the client device in response to the zoom level exceeding the threshold value; and
serving the content items in the viewable area which meet the predefined criteria for being considered expensive.

19. The system of claim 18, wherein the client device includes a rendering application configured to determine whether the zoom level exceeds the threshold value as a result of a zoom-in operation and to request the contents of the webpage if the zoom level exceeds the threshold value.

* * * * *